United States Patent
Kern et al.

(10) Patent No.: US 8,002,128 B2
(45) Date of Patent: Aug. 23, 2011

(54) DECKING BEAM RACK APPARATUS AND METHOD

(76) Inventors: Karl C. Kern, Plainfield, IN (US);
Brian C. Kern, Plainfield, IN (US)

( * ) Notice: Subject to any disclaimer, the term of this patent is extended or adjusted under 35 U.S.C. 154(b) by 290 days.

(21) Appl. No.: 12/354,017

(22) Filed: Jan. 15, 2009

(65) Prior Publication Data

US 2010/0176076 A1 Jul. 15, 2010

(51) Int. Cl.
*A47B 43/00* (2006.01)
(52) U.S. Cl. .......................... 211/194; 410/46
(58) Field of Classification Search .................. 211/189, 211/188, 41.16, 41.15, 191, 194, 186; 108/53.1, 108/53.3, 53.5, 55.1, 91; 312/111, 265.4; 206/509, 448, 511, 321; 410/46, 31, 32, 410/35, 77, 78
See application file for complete search history.

(56) References Cited

U.S. PATENT DOCUMENTS

| | | | |
|---|---|---|---|
| 541,989 A | 7/1895 | Bowley | |
| 2,632,567 A * | 3/1953 | Richtmyer | 211/85.5 |
| 2,699,911 A * | 1/1955 | Chase et al. | 108/53.5 |
| 2,863,566 A * | 12/1958 | White et al. | 211/41.14 |
| 2,877,602 A * | 3/1959 | Larsen | 211/175 |
| 3,147,860 A * | 9/1964 | Kean, Sr. et al. | 206/448 |
| 3,355,029 A * | 11/1967 | Eurey | 211/44 |
| 3,400,671 A * | 9/1968 | Erismann | 108/53.5 |
| 3,499,398 A * | 3/1970 | Murray | 108/53.5 |
| 3,533,502 A * | 10/1970 | Hansen | 206/386 |
| 3,565,018 A * | 2/1971 | Jay | 108/53.1 |
| 3,799,070 A | 3/1974 | Munson | |
| 3,804,033 A * | 4/1974 | Izawa et al. | 108/53.5 |
| 3,809,234 A * | 5/1974 | Kurick | 206/448 |
| 3,836,174 A | 9/1974 | Holman, Jr. | |
| 3,857,494 A * | 12/1974 | Giardini | 211/194 |
| 3,945,501 A * | 3/1976 | Jay | 211/194 |
| 4,186,841 A * | 2/1980 | Buckley et al. | 220/6 |
| 4,295,431 A * | 10/1981 | Stavlo | 108/55.1 |
| 4,427,117 A | 1/1984 | Matthewson et al. | |
| 4,650,381 A | 3/1987 | Durkin | |
| 4,662,805 A | 5/1987 | Tamez et al. | |
| 4,773,547 A * | 9/1988 | Bell | 211/194 |

(Continued)

FOREIGN PATENT DOCUMENTS

WO    WO 02/24496 A1    3/2002

OTHER PUBLICATIONS

Cargo Baskets Data Sheet, Ferguson Seacabs Limited, Denmore Road, Bridge of Don, Aberdeen, Scotland, AB23 8JW, Downloaded from website Feb. 9, 2008, 1 page (http://www.fergusonseacabs.com/index.php?option=com_content&task=view&id=41&Itemid=43).

(Continued)

*Primary Examiner* — Darnell Jayne
*Assistant Examiner* — Patrick Hawn
(74) *Attorney, Agent, or Firm* — Woodard Emhardt Moriarty McNett & Henry LLP

(57) ABSTRACT

A combination of racks for the management of conventional decking beams incorporates unique racks with special features facilitating the organization, storage, protection, and shipping of decking beams when the decking beams are not in use supporting shipments of cargo. Additional features facilitate stacking of racks when loaded with beams; and for stacking of empty racks themselves in minimal space for their storage or transportation when not in use. Identification of beams and of racks for wireless location-tracking is included.

1 Claim, 16 Drawing Sheets

U.S. PATENT DOCUMENTS

| | | | | |
|---|---|---|---|---|
| 4,986,705 A | | 1/1991 | Durkin | |
| 5,141,114 A | * | 8/1992 | Cate et al. | 211/85.8 |
| 5,233,931 A | * | 8/1993 | McCorkle, Jr. | 108/55.1 |
| 5,494,167 A | * | 2/1996 | Hasegawa et al. | 206/600 |
| 5,692,625 A | * | 12/1997 | Filipescu et al. | 211/195 |
| 5,941,667 A | | 8/1999 | Hardison | |
| 5,969,595 A | | 10/1999 | Schipper et al. | |
| 6,279,763 B1 | * | 8/2001 | Bush | 211/195 |
| 6,615,742 B1 | * | 9/2003 | Swanson | 108/55.5 |
| 6,784,809 B2 | | 8/2004 | Flick | |
| 6,814,529 B2 | | 11/2004 | Junge | |
| 6,895,867 B1 | | 5/2005 | Burrows | |
| 7,040,848 B2 | | 5/2006 | Sain | |
| 7,070,372 B2 | | 7/2006 | Denike et al. | |
| 7,131,803 B2 | | 11/2006 | Guarisco, Sr. et al. | |
| 7,430,471 B2 | | 9/2008 | Simon | |
| 7,802,526 B2 | * | 9/2010 | Brady et al. | 108/53.5 |
| 2003/0141207 A1 | * | 7/2003 | Pai | 206/335 |
| 2006/0142913 A1 | | 6/2006 | Coffee | |
| 2006/0269379 A1 | | 11/2006 | Orr et al. | |
| 2007/0040677 A1 | | 2/2007 | Blair, Jr. | |
| 2007/0059119 A1 | | 3/2007 | Hadar | |
| 2008/0217276 A1 | * | 9/2008 | Brady et al. | 211/195 |

OTHER PUBLICATIONS

Half Height Containers Data Sheet, Ferguson Seacabs Limited, Denmore Road, Bridge of Don, Aberdeen, Scotland, AB23 8JW, Downloaded from website Feb. 9, 2008, 1 page (http://www.fergusonseacabs.com/index.php?option=com_content&task=view&id=38&Itemid=43).

Open Top Containers Data Sheet, Ferguson Seacabs Limited, Denmore Road, Bridge of Don, Aberdeen, Scotland, AB23 8JW, Downloaded from website Feb. 9, 2008, 1 page (http://www.fergusonseacabs.com/index.php?option=com_content&task=view&id=35&Itemid=43).

Tubular Transportation Frames Data Sheet, Ferguson Seacabs Limited, Denmore Road, Bridge of Don, Aberdeen, Scotland, AB23 8JW, Downloaded from website Feb. 9, 2008, 1 page (http://www.fergusonseacabs.com/index.php?option=com_content&task=view&id=33&Itemid=43).

Waste Skips Data Sheet, Ferguson Seacabs Limited, Denmore Road, Bridge of Don, Aberdeen, Scotland, AB23 8JW, Downloaded from website Feb. 9, 2008, 1 page (http://www.fergusonseacabs.com/index.php?option=com_content&task=view&id=34&Itemid=43).

* cited by examiner

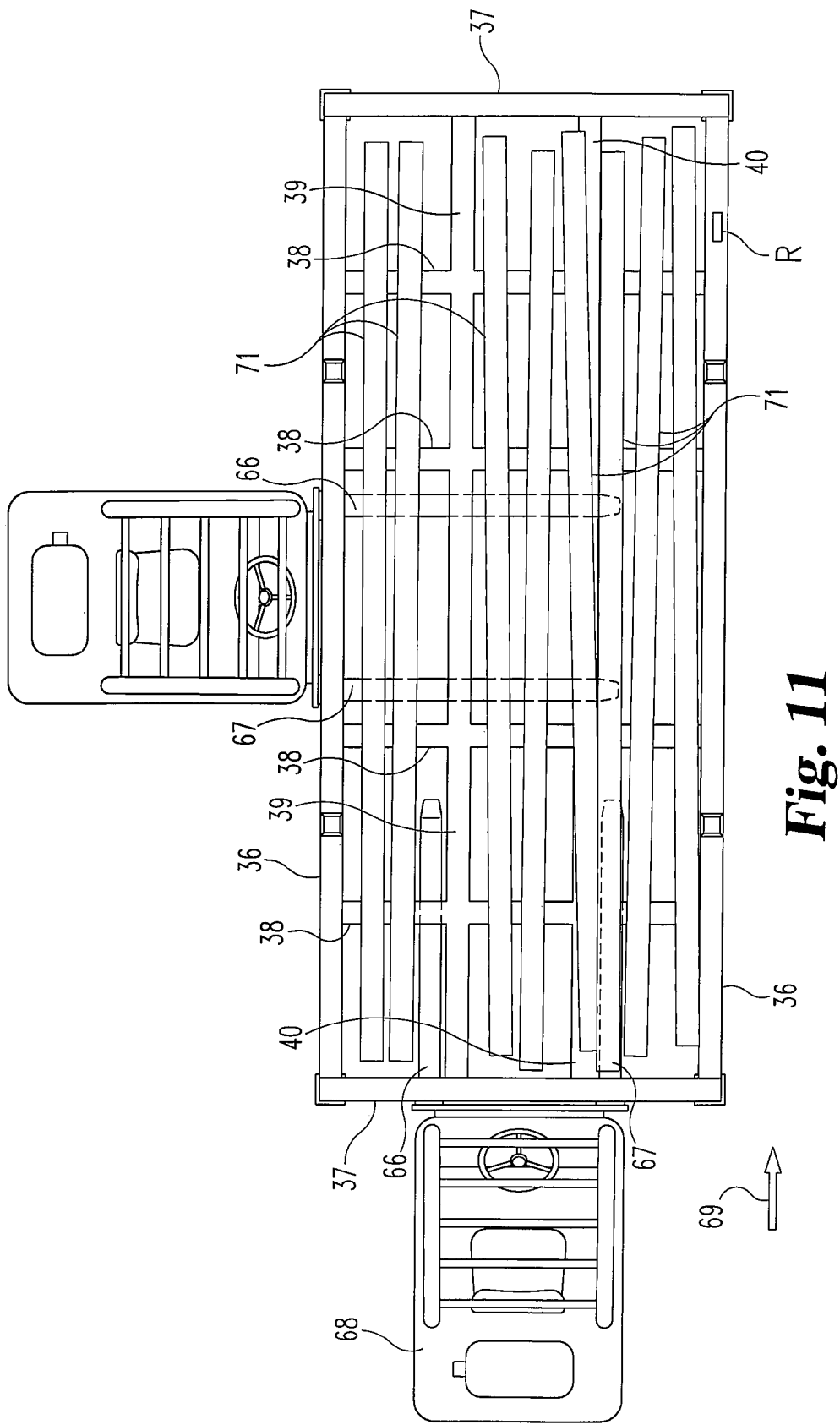

DECKING BEAM RACK APPARATUS AND METHOD

BACKGROUND

For shipping freight by land, sea or air, it is usually desirable to maximize the density of packing, within the available cargo space and the load carrying ability of the transporter. But packing density also may be limited by the nature of the materials themselves or the nature of the packaging of the materials being shipped. Otherwise materials or packaging can be crushed.

To address this issue in transporters such as trailers for hauling over land and in ocean shipping containers and, possibly, in air freight planes, they are equipped with horizontal and/or vertical slotted tracks on the inside surfaces of facing walls of the cargo space. These slots are used to receive ends of decking beams extending across the space between the walls of the trailer or container.

Decking beams, sometimes referred to as load bars, load beams, logistics bars or logistic beams, for example, are optional equipment; they are not part of a trailer or container. They may be the property of the carrier or the property of the shipper. Usually decking beams are in the form of a tube or a bar, usually made of aluminum or steel, with an end piece "footer" extendable at each end and which has a hook or some other connector which can be fitted in the slots in the tracks at facing walls in the cargo compartment. An example of a decking beam and installation more than thirty years ago, can be found in U.S. Pat. No. 3,836,174. A more recent system is disclosed in U.S. Pat. No. 5,941,667 issued Aug. 24, 1999. The beams may be mounted at selectable heights to best accommodate the nature and size of the cargo to be transported, to minimize or eliminate stacking of packages or pallets of cargo. The beams are spaced along the length of the cargo space at locations appropriate for the cargo to be supported. Their function is to increase load capacity of the transporter without excessive stacking of cargo.

Decking beams are produced by several manufacturers. The dimensions of a decking beam are approximately 2.5"×4"×94" when the "footers" at opposite ends are retracted. The weight of a decking beam is approximately thirty pounds each. They must be manually set in place during the loading process and manually removed during the unloading process. We believe it would be advantageous to have the beams conveniently stored in a rack that can be moved along a loading dock or from door to door in a warehouse, to be in close proximity to the site of loading or unloading a trailer or container. In addition, many loads that utilize decking beams are one-way moves. In such cases, if the trailer is to return empty to the point of origin, it may be necessary that the beams go along with it, for re-use without being actually used during the return trip. Return trips without loads are not productive. There is a need for better management of decking beams. The present invention is directed to meeting this need.

BRIEF DESCRIPTION OF THE DRAWINGS

FIG. 11 is a top view of the decking beam rack showing some decking beams of a first layer resting on the top frame of the rack but not yet lined up; and showing schematically, an example of fork-lift truck access at an end and at a side of the rack.

DETAILED DESCRIPTION OF THE ILLUSTRATED EMBODIMENT

Figure 1:
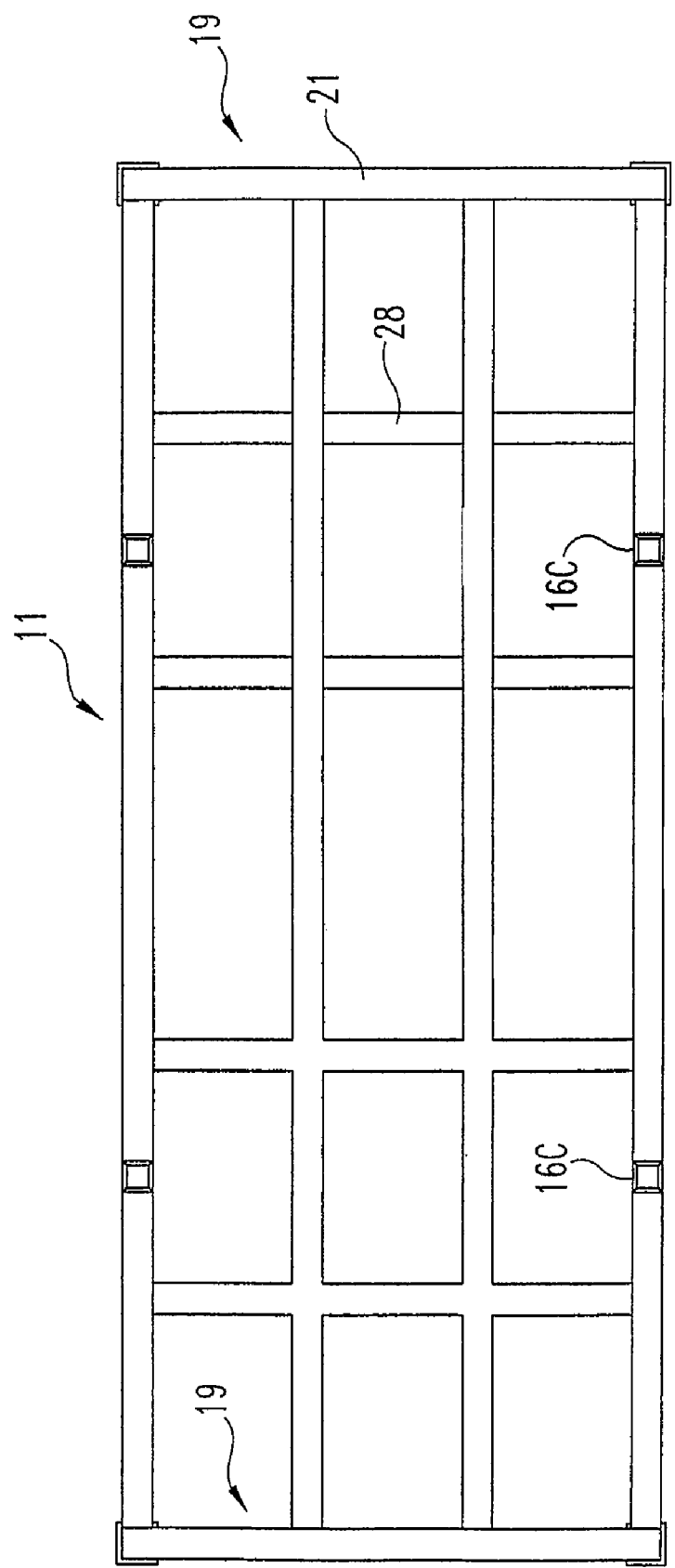
FIG. 1 is a top view of one embodiment of a new decking beam rack.
Figure 2:
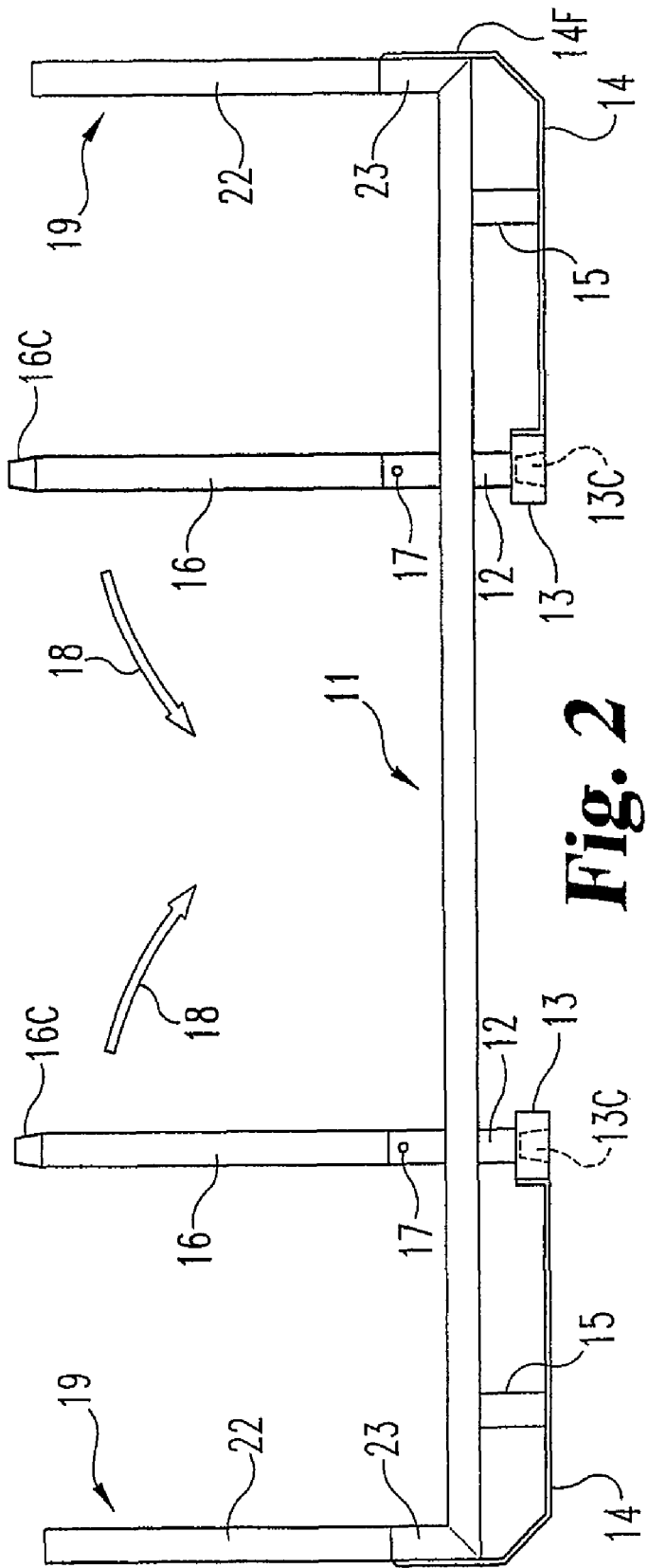
FIG. 2 is a side view thereof.

An embodiment of an aspect of the present invention includes a decking beam rack used to organize, store, protect, and ship decking beams when they are not in use.

Referring to FIGS. 1-4, the decking beam rack includes a rectangular frame 11, with legs 12 providing some support for the frame 11 at a height about four inches above some surface such as a loading dock or warehouse floor. The four legs 12 have stacking cups 13 at their lower ends and which have downwardly-opening cavities 13C in them. Runners or skids 14 are fixed to the frame 11 at the ends and at the stacking cups. Braces 15 are secured to the runners and frame between the end of the frame and the legs. The upturned front face 14F of the runners is useful to serve as a bumper. The legs, cups, runners and braces provide lower framework supporting the frame 11.

Intermediate posts 16 are pinned at 17 to the upper ends of the legs to enable pivoting the posts downward in the direction of the arrows 18 when the rack is empty and collapsed for stacking of racks in temporary storage. This feature can also be used when decking beams are being loaded onto or unloaded from either side of the rack.

End panels 19 are provided at each end of the rack. Each of them has a set of vertically spaced horizontal bars 21 mounted in a pair of posts 22 mounted in the upstanding sockets 23 in the frame ends. These panels can be removed by simply pulling the posts out of the sockets. Then the panels can be laid on the frame when the posts 16 are folded down to collapse the rack. Or, the end panels can be hinged like the posts 16 to fold down to be in the same horizontal plane as the intermediate posts for convenient stacking of empty racks on each other to store at the manufacturer's site for shipment from the manufacturer to a customer, and at any other time when the racks might not be in use.

Figure 3:
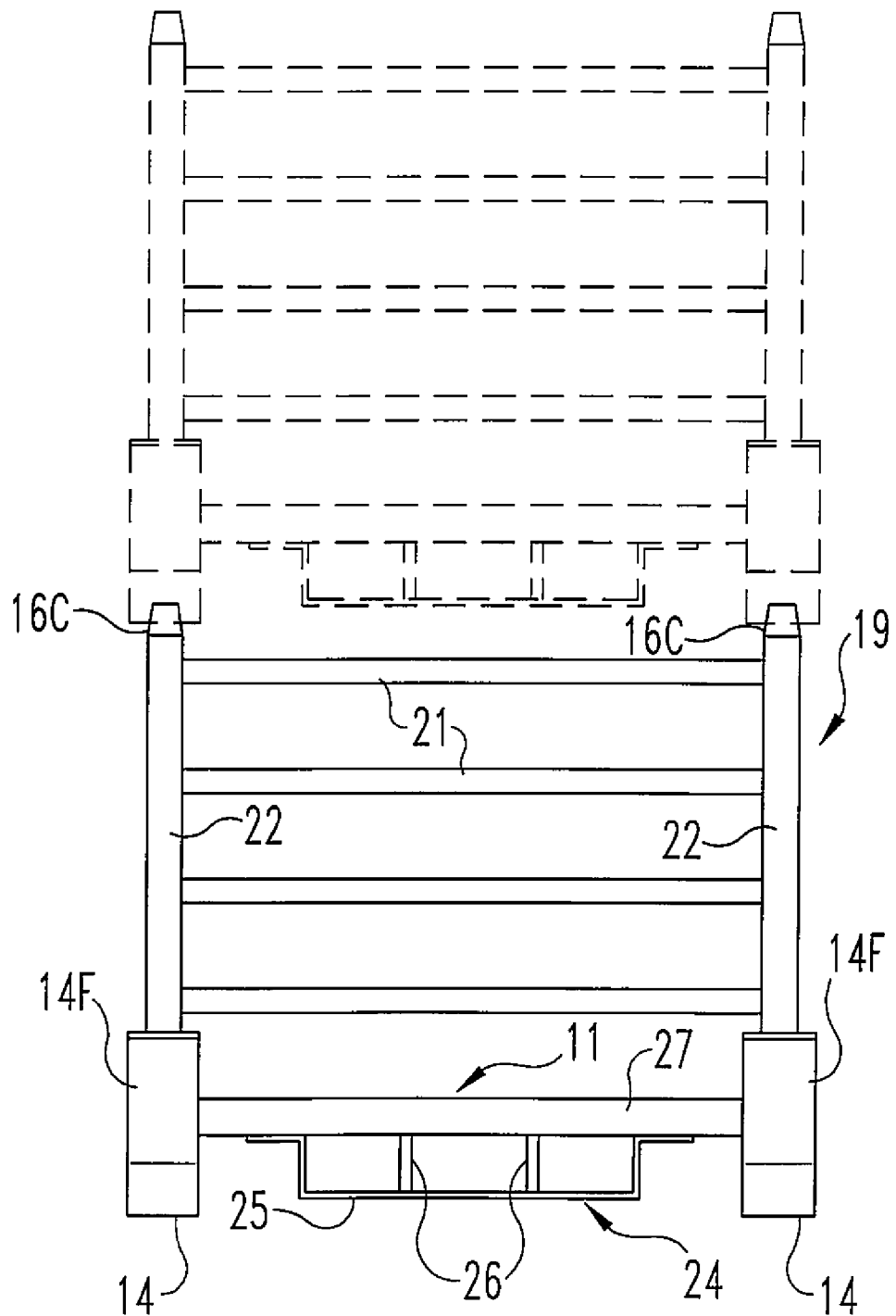
FIG. 3 is an end view thereof.
Figure 4:
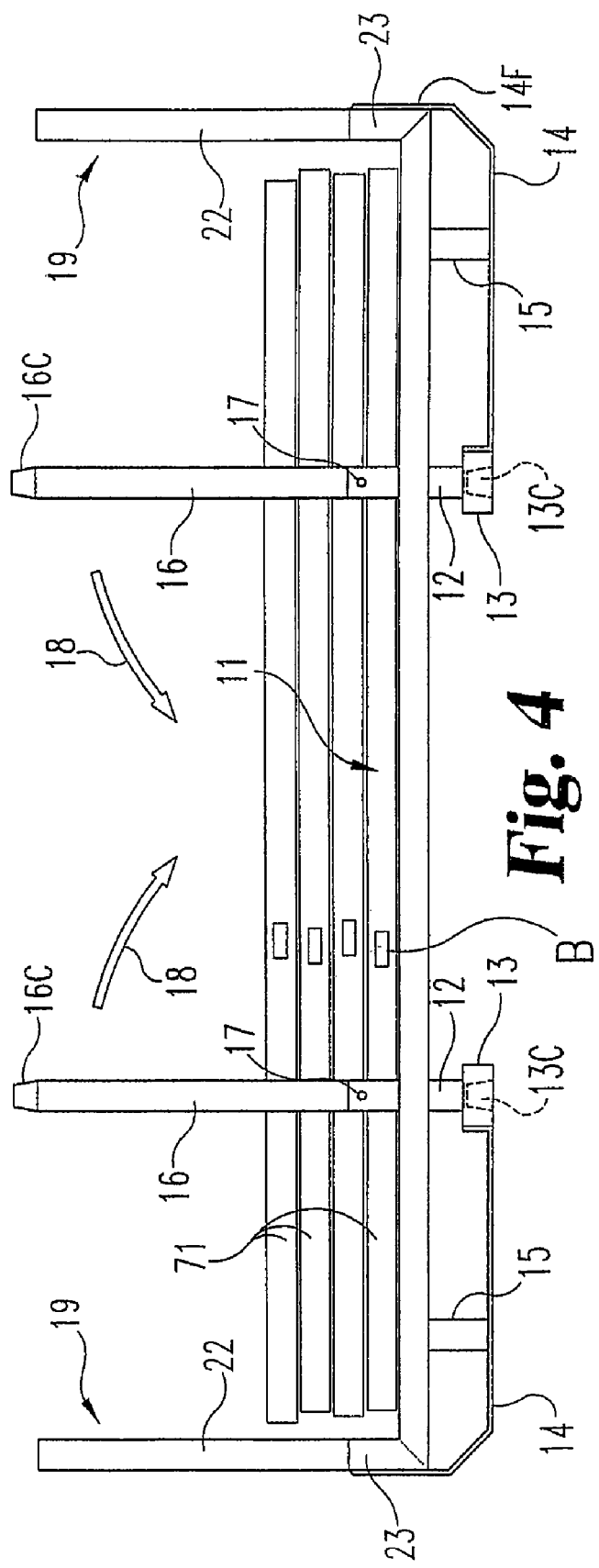
FIG. 4 is a side view thereof, loaded with decking beams.

The tops of the posts 16 are tapered, preferably in a frusto-pyramidal shape at 16C, to receive the stacking cups of another rack mounted above the one as shown in the dotted lines in FIG. 3. This feature is useful when the racks are loaded with decking beams and waiting in a warehouse, loading dock, or in a transport trailer or container, or in transit from an origin to a destination.

Figure 5:
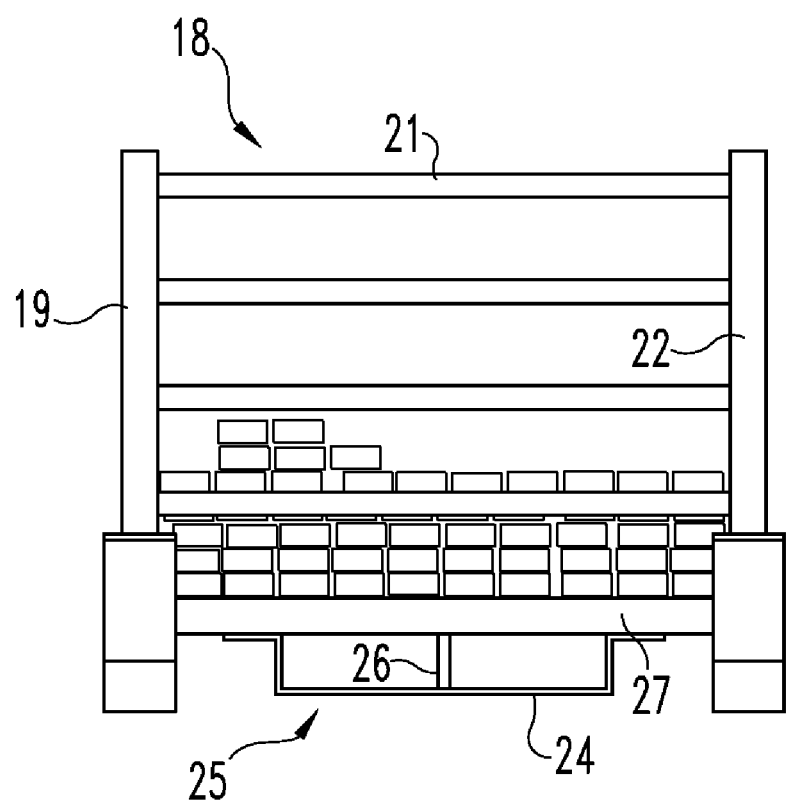
FIG. 5 is an end view thereof, loaded with decking beams.

Considering the size and shape of the rack, expected to be approximately 48 inches wide, 32 inches tall if to be stacked three high in a truck, or 48 inches high if to be stacked two high, and 98 inches long in one model, or 104 inches long in another, to hold about eighty decking beams, provision is made for easy movement and control of it by a fork-lift vehicle. This includes a fork receiver 24 (FIG. 5) near each end of the frame and which includes a generally U-shaped guide 25 with a center guide rail 26, all fixed to frame cross-members such as 27 at the end, and 28 spaced from the end. The racks can be stacked as indicated by the dotted lines in FIG. 3.

Figure 6:
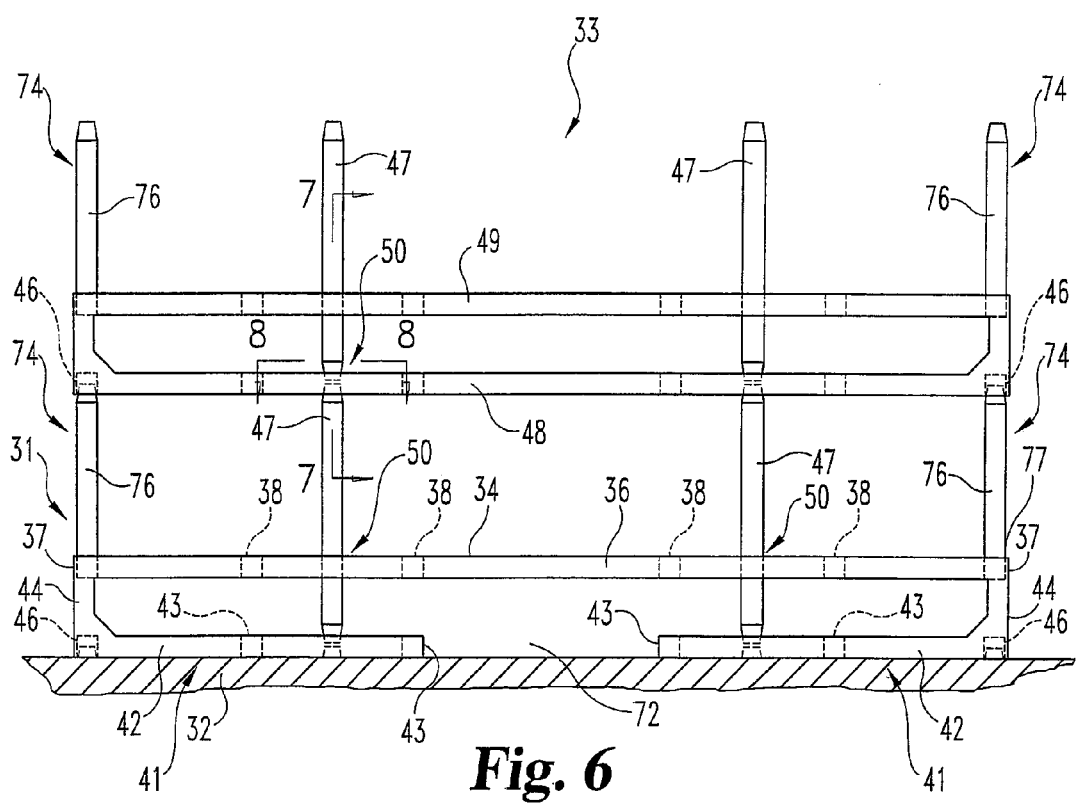
FIG. 6 is a side view of two decking beam racks of another new decking beam rack, with one of the two racks stacked on the other of the two racks and without any decking beams on the racks.

Referring now to FIGS. 6 through 14, FIG. 6 shows another embodiment of decking beam racks. Rack 31 is on the floor 32, and rack 33 is supported by rack 31. Rack 31 is almost identical to rack 33 so a description of rack 31 will suffice for both. The rack has an upper frame 34 comprising upper side rails 36 and upper end rails 37 (FIG. 6). It also has four cross members 38 (FIGS. 6, 11 and 12) welded to the side members. There is also bottom framework extending from both ends of the rack toward the center. There are two end box frames 41. A description of one will suffice for both. It includes bottom rails 42, one at each side of the rack, with tying cross members 43 at locations directly under the cross members 38 of the upper frame. An arm 44 is fixed to and extends upward from each of the rails 42 at the ends of the rack and supports the end rail 37 of the upper frame. A lower end rail 46 (FIGS. 6 and 9) extends across the frame between the junctions of side rails 42 and columns 44.

Figure 7:
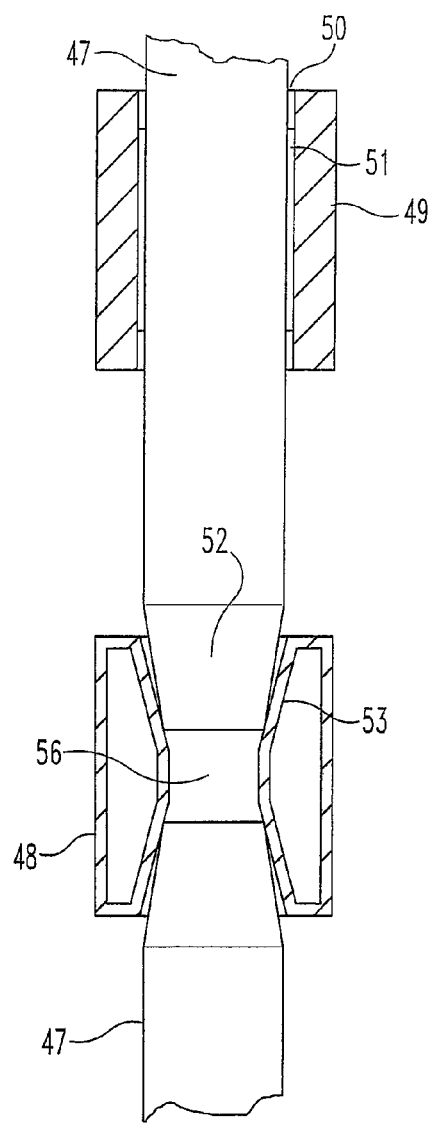
FIG. 7 is an enlarged cross-section of a portion of the upper rack taken at line 7-7 in FIG. 6 and viewed in the direction of the arrows.
Figure 8:
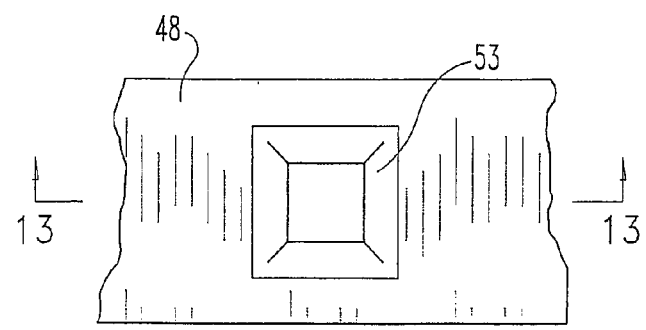
FIG. 8 is an enlarged top view of a fragment of a bottom rail socket location as viewed (without post 47) at line 8-8 in FIG. 6 and viewed in the direction of the arrows.

Intermediate removable posts 47 are provided at four locations on the rack. These posts are tubes of rectangular cross section and are received through holes 50 at four locations in the frame side members 36. The same type of construction is provided for the upper frame side members 49 of the upper rack. The upper and lower ends of each of the posts are frusto-pyramidal shaped and received in sockets of the same shape in the rails 42 of the rack 31. The detail of this feature is best shown in FIGS. 7 and 8, showing the detail of one of the sockets in the lower side rail 48 of the upper beam rack 33 in FIG. 6. With the lower and upper side rails 48 and 49, respectively of the upper rack, both of which are of rectangular tube cross section, the hole in the upper rail 49 is large enough for the post 47 to slide through the hole. The frusto-pyramidal lower end 52 of the post is received in the similarly-shaped socket upper wall 53. The tapers between the socket wall and the post wall are of a non-locking wedge such that, when desired to remove the post, it can be removed from the socket for storage, but when needed to be stable in the socket it will be sufficiently tight to confine beams stacked (as in the FIG. 4 embodiment) and support the load of an upper rack of beams on the upper end of such post. Thus, while it is a stable wedge connection, it is not locking.

The ends of all the posts are shaped alike so that the posts can be used with either end serving to be stable in a socket in which it is received, whether it is in the lower one of the two racks or in the upper one of the two racks or in more racks if needed for storing beams in multiple superimposed (stacked) racks.

Figure 13:
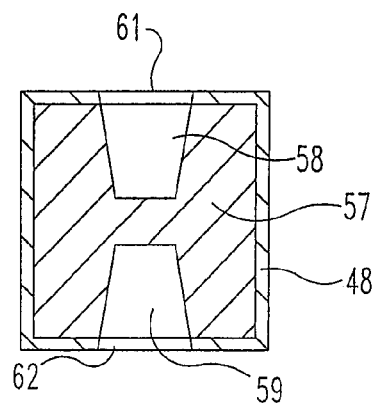
FIG. 13 is a view like FIG. 8 but showing a section through a solid socket welded into a frame side member.

Referring further to FIGS. 7, 8 and 13, the socket detail at 53 in FIG. 7 can be a formed-in piece welded or otherwise secured in the tube 48 with an opening 56 between the lower end of the post 47 above it and the upper end of the post 47 below it. Other construction may also be used. An example is in FIG. 13 where a solid block 57 having upper and lower post receiver cavities 58 and 59, respectively, are formed in it to receive the lower end of an upper post and the upper end of the lower post. This block 57 may be an insert slid into place from one end of the rail 42 for the lower rack (48 for the upper rack) and welded in place aligned with openings 61 and 62 provided in the upper face and lower face of the rail 48, respectively, and, the block 57 welded in place in the tubing. One alternative to that assembly style is to cut the tube 42 and weld the block between the cut ends of the tube 42. Other means of providing a socket may also be devised. While the upwardly opening and downwardly opening sockets are intended to have interfitting tapers with the tapers of the posts 47, they are not intended to be interlocking. Therefore, while the connections of the posts to the sockets make the posts immovable longitudinally or laterally of the rails 42 and 48, the posts can be readily pulled vertically from the sockets to facilitate removal from the racks and storage of the posts between the top and bottom frame cross members of a rack as shown in FIG. 9.

Figure 9:
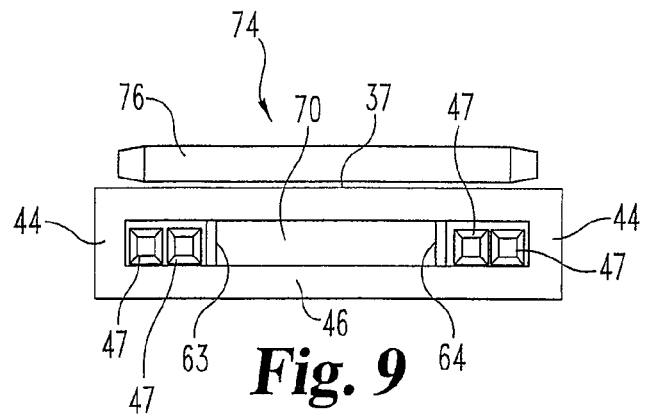
FIG. 9 is an end view of the embodiment of FIG. 6 and without any decking beams on it and some posts stored within it.

As shown in FIG. 9, there is provided room for storage of four of the intermediate posts 47 between the top frame cross members 38 and the bottom frame cross members 43 and 46, at each end of the frame. For this embodiment of the rack, a lift-fork receiver tube is provided in each by the upper frame cross members and lower frame cross members and side guides 63 and 64 (FIG. 9) so, as shown in FIG. 11, the lifting forks 66 and 67 of the fork-lift truck 68 can enter in the direction of arrow 69 and pick up a rack empty or loaded with decking beams 71, for example, and move it across a storage yard, a loading dock or floor of a warehouse or into or out of a semi-trailer, for example. Similarly, a fork receiver 70 can also be provided in the same way at the opposite end of the rack.

Figure 12:
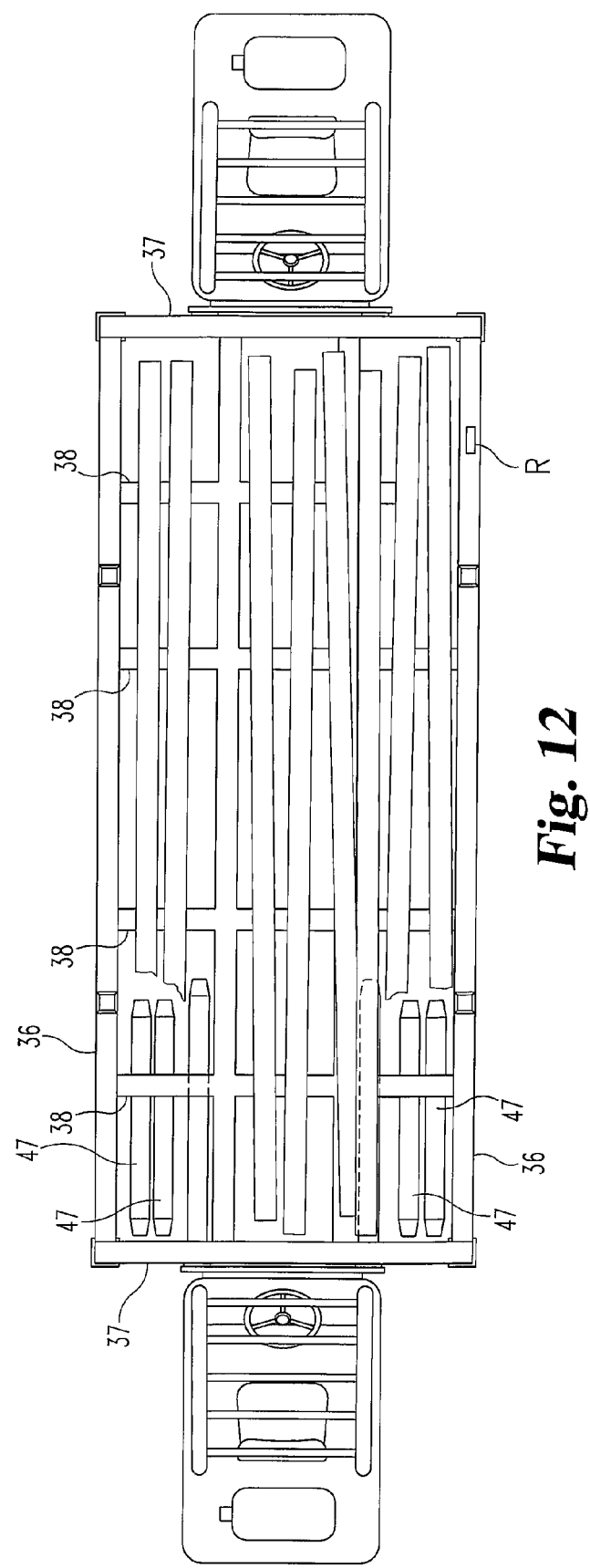
FIG. 12 is a top view with the decking beams on the rack and showing lifting forks at both ends of the rack, and side posts stored beside the fork receiver opening in one end as in FIG. 9.
Figure 14:
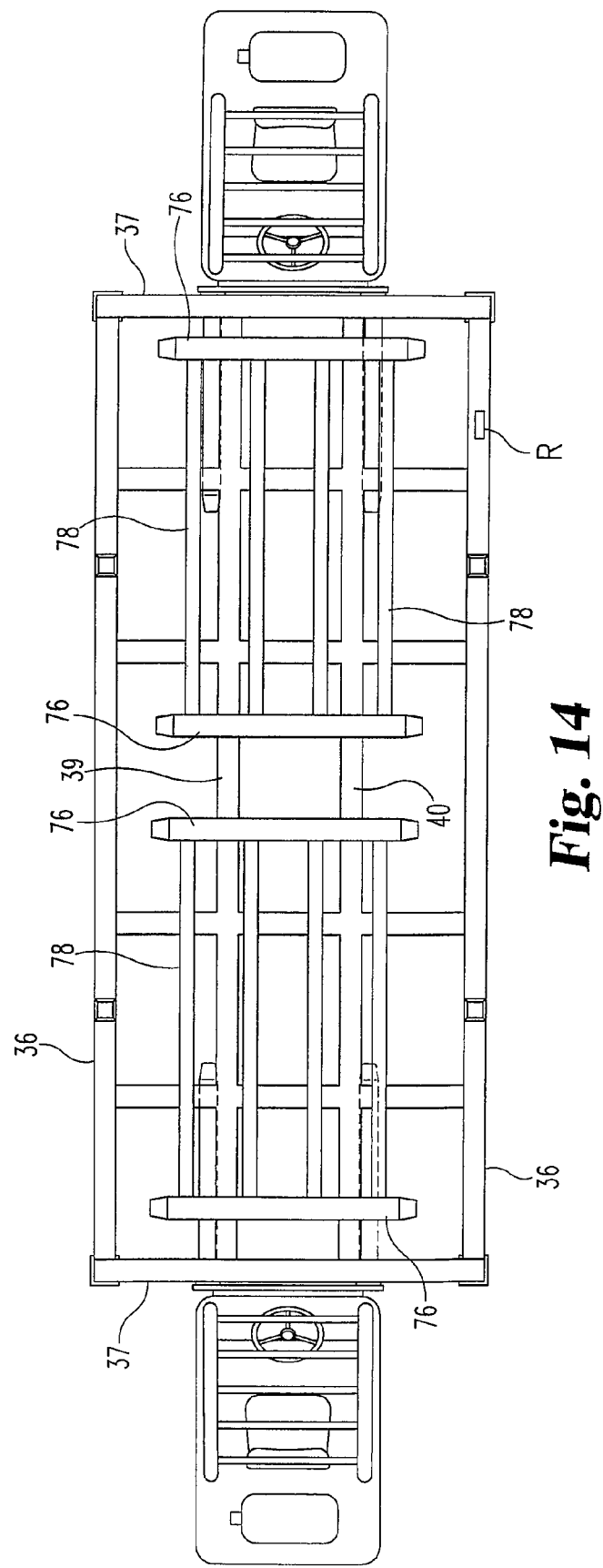
FIG. 14 is a view similar to FIG. 12 but without the beams and stored posts, but showing end panels stored on the upper frame above the areas where the posts can be stored inside as in FIG. 12.

Referring to FIG. 6, there is shown an option in that the bottom side rails 42 of the lower rack, end at intermediate cross members 43, but the lower side rails 48 of the upper rack are continuous. Entry of lift forks from either side or end of the racks is indicated in FIGS. 11 and 12. The space 72 between cross members 43 at the bottom frame portions 41 of the lower rack provides more vertical space for entry of the lift forks to engage the bottom of the upper frame rail 36 and either intermediate rail 39 or 40 on either side of the rack. Lift fork entry at the sides of both FIG. 6 versions, of the rack is ample. Similarly, either version of the rack can be used as the bottom rack in a stack of racks loaded with beams.

Figure 10:
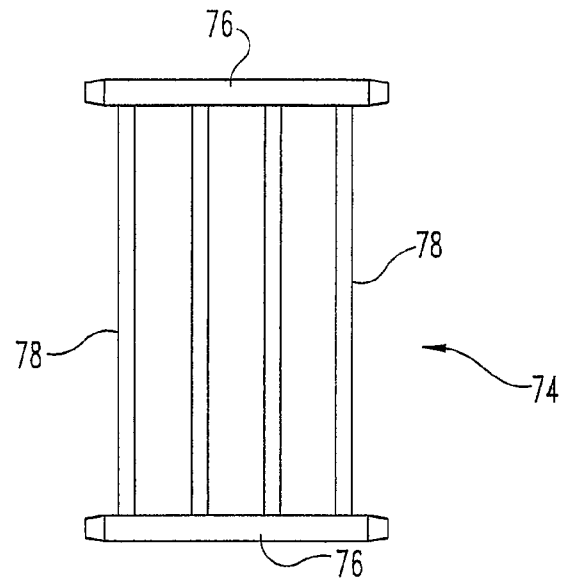
FIG. 10 is view of an end panel removed from the rack.

FIG. 10 is an illustration of the end panel 74 which is constructed in essentially the same manner as that shown in 17 in FIG. 3. It has end posts 76 which can be constructed as are intermediate posts 47 and received in sockets 77 in four corners of the upper frame. The sockets 77 are provided only in the upwardly opening direction and are otherwise similar to those provided as shown FIGS. 7, 8 and 13. Crossbars 78 are vertically spaced along the end posts 76.

For use of the rack for storage of decking beams, they may be placed on the rack by hand or by machine and extend the length of the rack. The intermediate posts can be placed in the sockets on the rack whenever desired by the loaders. Similarly, the end frames 74 may also be installed at the preference of the loaders to retain the beams when in place between the end frames when the rack is moved forward or backward.

If, and when, it is necessary to store the racks themselves without beams on them, the racks can be readily converted to a flat configuration and stored in stacks. For this purpose, the four intermediate posts 47 are pulled out of their sockets and all four can be inserted into the one end of the rack as shown in FIG. 9 or two can be inserted at each end. The opposite end portions of the posts are supported by lower frame cross members 46 and 43. The end panels 74, being flat, can be placed flat on top of the cross members 38 and end members 37 in the top of the frame. Therefore, as an example, if the assembly of one rack erected with the intermediate posts 47 and end panels 74 installed, is 30 inches, but the total height of just bottom frame 42 and top frame 36 is about six inches, the storage of the end panels 74 on top of the cross member 38 makes a total height of the rack when converted to storage, about eight inches. Therefore, numerous empty racks can be stacked in a reasonable area and height in a warehouse or transported from place to place in a semi-trailer or on a wagon.

Figure 15:
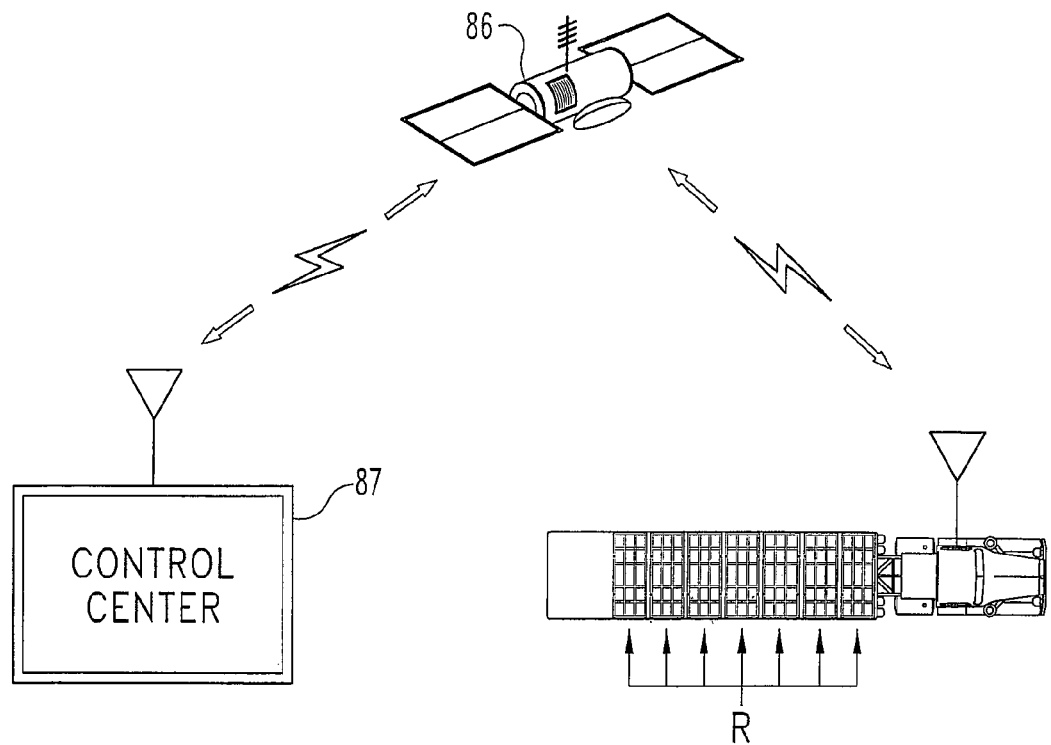
FIG. 15 is a schematic illustration of a wireless rack-tracking system.

In FIG. 15, there is a schematic representation of a tractor, semi-trailer combination containing seven beam racks which do not have any beams on them. Each of such racks would have a unique identifier "R" (FIG. 11) bearing a number or letter or other combination of features for identifying this rack and distinguishing it from all other decking beam racks. The identifiers can be useful in association with one or more satellites 86 of a global positioning system (GPS), or other wireless location determination system, to identify that rack in that trailer in transit, thus locating the rack relative to a control center 87.

Figure 16:
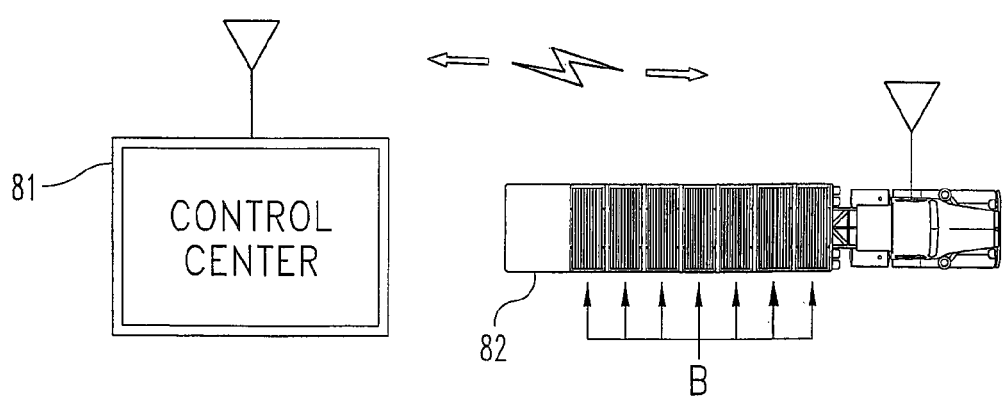
FIG. 16 is a schematic illustration of a wireless decking-beam identifying system.
Figure 17:
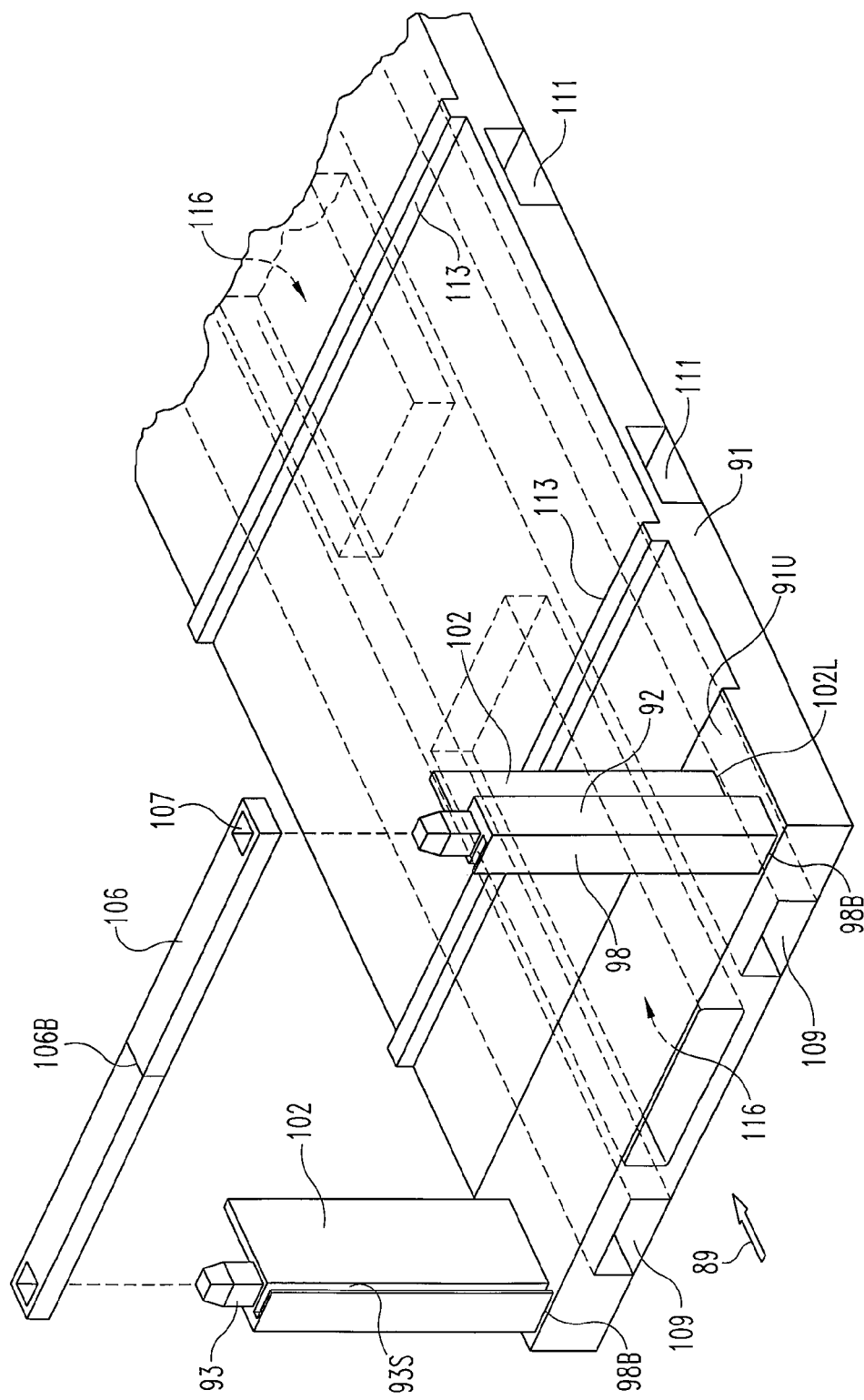
FIG. 17 is an isometric view of a portion of a rack according to a third embodiment.
Figure 18:
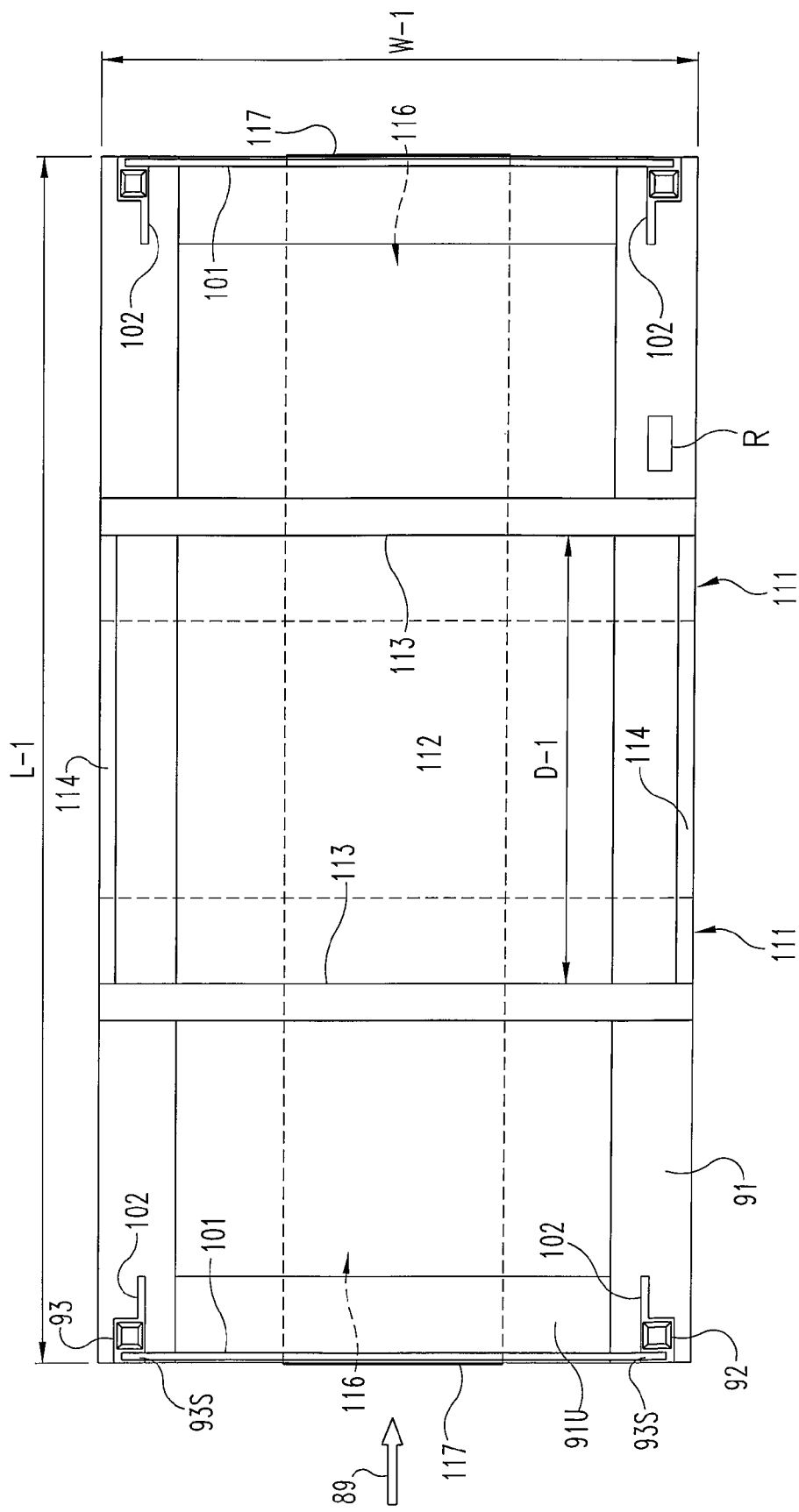
FIG. 18 is a top plan view of the rack of FIG. 17.

In FIG. 16, the schematic representation includes beams loaded on the racks in the semi-trailer 82. Each beam 71 has a unique identifier device "B" (FIG. 4) bearing a number or letter or other combination of features for identifying that beam and distinguishing it from all other beams. The identifiers can be useful in association with a wireless locating and identifying system such as mentioned above for finding and identifying not only the racks, but also for the beams as well.

A variety of technologies is available for such functions. A useful guideline for selection of equipment is that it be RFID (radio frequency identification devices) compatible. In addition to use of such a system for tracking and identifying while racks and/or beams are in transit, it can be useful at a control center 81 at a warehouse or some shipping terminal where beams 71 or racks, loaded or empty might be stored, for keeping an inventory, and for finding their particular locations as they are moved around in an area in which radio frequency identification devices (RFID) can be used.

Figure 19:
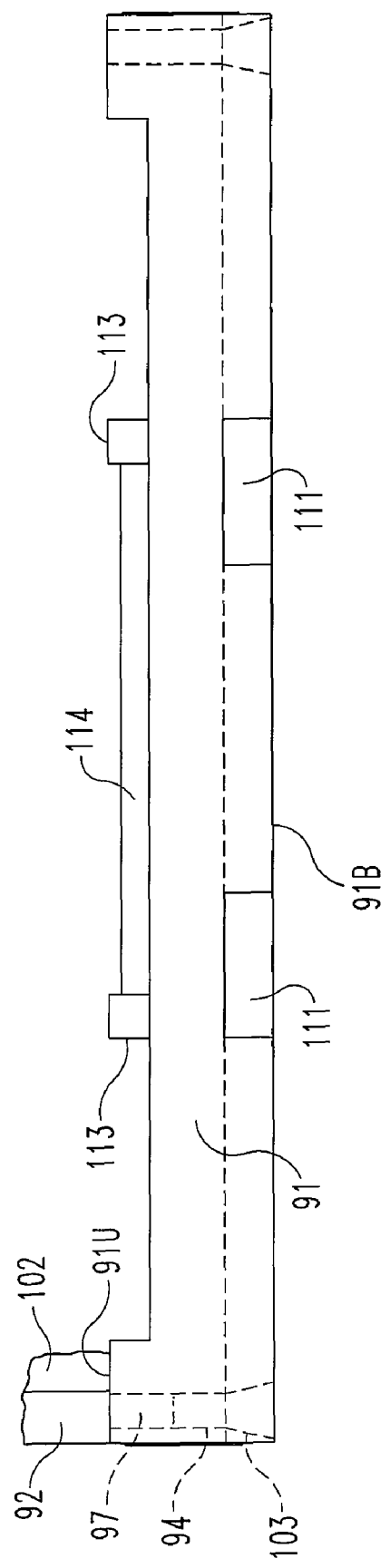
FIG. 19 is a side elevation view of the rack of FIG. 17.

In FIGS. 17-20, a third embodiment of decking beam rack and components is shown. In this embodiment, a base 91 is provided with four post sockets in the corners. Viewing the rack in the direction of arrow 89, there is a base 91, a right-hand post 92, a left-hand post 93, and similar posts at the opposite end of the rack. For example, as shown in FIG. 19, a hole 94 extends from the bottom of the base to the top of the base at the end of the rack. The upper portion of this hole 94 is typically square in cross-section, and receives the bottom portion 97 of the post 92. The post has a flange 98 which extends from the outer face of the post inwardly toward the center of the rack. This flange provides a slot 93S which faces post 93 and receives an end panel 101 (FIG. 18) closing the end of the rack. The post 93 is of construction like that of post 92 but with the slot facing the slot in post 92. So it cooperates with post 92 in holding the panel 101 which can be raised out of the slot or installed in the slot, when desired.

Figure 20:
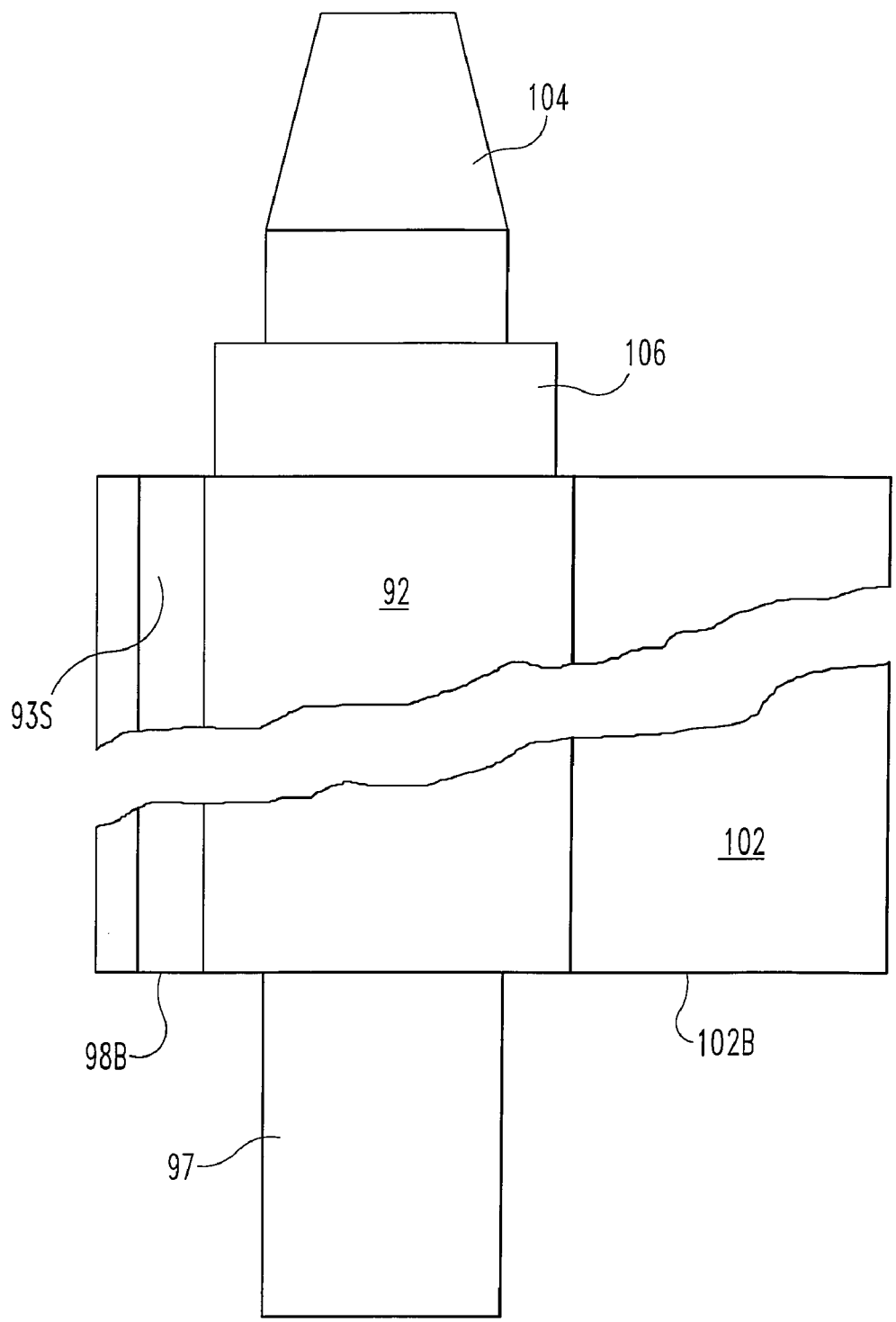
FIG. 20 is an enlarged elevation view of an end post for the rack of FIG. 17.

The length of the rack between end panels 101 is great enough (about 98 inches) to contain decking beams useful in highway trailers operating in the United States. The end posts are about three inches square. Considering the fact that decking beams are made by numerous manufacturers, and are not always of exactly the same length, the end posts are each provided with a side extension panel such as 102 fixed to the post. These are about 3 inches wide. If decking beams a bit shorter than standard are encountered, these post extensions in the direction of arrow 89 will confine the beams to prevent them from falling off the sides of the rack. Since this embodiment of the rack is intended to be capable of supporting another fully loaded rack on top of it, a lower portion 103 of the socket 94 is a frusto-pyramidal shape to be received on the frusto-pyramidal top portion 104 of the post 92 under it. The lower ends of the flange 98 at 98B, and of the extension panel 102 at 102L rests on top of the base at 91U supporting the post on the base. A stabilizer bar 106 has a hole 107 at each end of the bar. These holes are sized and shaped (usually square) to be received on the rectangular portion of the stem at the top of the posts to maintain a fixed spacing between the upper ends of the posts when another rack is mounted on this rack in a manner similar to that shown in FIG. 3 for the first embodiment of the invention, and in FIG. 6 for the second embodiment of the invention. As shown in FIG. 20, the end of the stabilizer bar serves as a collar resting on top of the post 92 and which is available to support the bottom 91B of any rack that is stacked on top of this first rack.

The base of the rack has two longitudinally-extending channels, or tubes 109 (if desired) to receive the lifting forks of a fork-lift truck from either or both ends, if desired. Similarly, there are two transverse extending channels or tubes 111 to enable access of lifting forks for lifting of the rack from either side of the rack with a fork-lift truck.

After use of the rack for storing or transporting beams, the rack can be collapsed for convenient storage or transportation of the racks themselves if and when needed. For this purpose, the end panels 101 can be lifted out of their slots 93S and placed flat on the central storage area 112, fitting between the transverse ribs 113 on the base 91. The ribs are high enough to fit both end panels 101 on top of each other between the ribs. Also, in order to prevent sliding of the stored panels off the sides of the rack, rails 114 are provided between the ribs 113 at each side of the rack. For storage of the stabilizer bars and end posts, there are compartments 116 extending inward from each end of the rack and having a door 117 at each end, closing the compartment. So two posts and one stabilizer bar can be stored in each of the compartments, from each end of the rack. If it happens that the overall length of the storage compartment 116 will not accommodate the approximately 44 inches length of the stabilizer bar, a hinge can be provided at 106B to enable folding to fit in the storage compartment long with the posts whose overall length from end to end is typically more than 32 inches but less than 42 inches. As mentioned above, the overall cross-sectional dimension of the posts, excluding the flange 98 and extension panel 102, is three inches by three inches. As mentioned above for the previously-described embodiments, the tapers on the posts and sockets are non-locking to avoid a jamming which could otherwise make it difficult to remove the upper rack from the lower one of a pair of stacked racks. It might be noted, particularly from viewing FIG. 18, that the post 92 on the right-side of the rack at the left-end end is of the same configuration as the post on the left side of the rack on the opposite end. This feature accommodates the end panels 101 at each end of the rack. It also provide an effective side margin for containment of the beams on the rack at both ends so that, beams from various manufacturers and which may have some differences in manufacturing tolerance, will still be contained within the side margins defined by lines between the extension panels at each end of the rack.

For purposes of example but without limitation, the overall length L-1 of a rack is preferably from 96 to 98 inches for use with beams used in trucks. It is 110 to 118 inches for transporting decking beams of a length useful in railway cars. The overall width W-1 of the rack for use in trucks is preferably 48 inches, while the overall width of racks for use in railway cars is 50-54 inches. The distance D-1 between the rails 113 for storage of the end panels 101 is preferably 32 inches to easily accommodate the height of the panel 101 from the top 91U of the base and the top of the slot in the post. The overall height of the base 91 from the bottom 91B to the top 91U is about nine inches. While the majority of the material of construction of the base, the posts and the stabilizer bars is preferably fabricated steel plate, other materials may also be found suitable. A variety of materials may be used for the end panels 101. Plywood, sheet metal, solid or perforated or "expanded" metal grating or other materials suitable for endwise location and retention of a load of beams can be used. Material having openings in it can be helpful for manually counting beams in a load, as is true of the other racks. Similarly to the other racks, unique rack identifying indicia such as "R" can be employed on this rack.

It can be seen that this rack is totally collapsible from its erect condition for storing and shipping decking beams, and stacking racks loaded with beams, to its collapsed condition for stacking empty racks on top of each other.

In summary, the decking beam racks disclosed above are storage and shipping devices to address the various problems mentioned above in dealing with decking beams.

The racks can be collapsed when not in use, for more efficient shipping and storage of empty racks.

The racks can be easily moved from either direction with a forklift truck.

The racks provide users of decking beams with a convenient and mobile storage unit in a warehouse environment and also may be handled with a standard size forklift for ease of loading into trailers, vans, or containers for efficient shipping of decking beams.

Because of the relatively uniform width of trailers and containers on public highways in the United States, decking beams are of relatively the same length and so the decking beam racks herein would be compatible to virtually all commercial trailers and containers.

The decking beam rack can be knocked down (for storage when not in use), or set-up for loading/unloading (of the beams in and out of the rack) or set-up for shipping (of the rack full of beams in and out of the trailer or container).

The decking beam rack will serve users of decking beams by providing:

1. Protection from damage of the beams.
2. Organization of beams into handle-able quantities.
3. Mobility of beams inside the warehouse with a standard forklift.
4. Efficient transport between warehouses on trailers or containers.
5. Inventory control since beams may be counted from one end.

Various materials suitable for the racks are readily available. For example only, but without limiting choices, steel tubing of rectangular cross section or steel plate can be suitable. Examples of technology useful for wireless identification and location work can be found in U.S. Pat. No. 6,784,809, and Application No. US 2007/0040677. There are many others.

What is claimed is:

1. The combination of a collapsible first rack and a collapsible second rack stackable together when in use for holding decking beams which are used to support cargo in transportation vehicles, the first rack and the second rack both comprising:

an elongate rectangular base with opposite ends and opposite sides and having a footprint length sufficient for the base to retain decking beams within the footprint of the base when the beams are placed on top of the base lengthwise, and the base having a footprint width sized to retain a layer of said decking beams placed on the top of the base side by side, said base having four corners forming a rectangular pattern on the base;

two end panels mounted to said base and having an erect position when in use limiting movement of cargo atop said base and a stored non-vertical position atop said base when not in use, each of said end panels including two spaced apart and vertical extending end posts and a plurality of horizontal cross bars extending between and connected to said two posts limiting movement of cargo off of said opposite ends of said base, each of said posts mounted to a separate one of said four corners locating said two end panels at opposite ends of said base, said posts normally extending vertically at said four corners to retain said beams within the footprint of the base when the beams are in place on the top of the base, said posts and said cross bars movable in unison for each end panel from said erect position to said non-vertical position and back;

side posts mounted to said base intermediate said opposite ends and having an erect vertical position when in use limiting movement of cargo off of said opposite sides of said base and a stored non-vertical position when not in use, said side posts having top ends configured to mountingly receive another rack stacked thereatop, said side posts depend below said opposite sides and located intermediate said opposite ends, said end posts and said side posts have ends with tapered shapes allowing said first rack and second rack to be vertically stacked together when in use to receive decking beams; and, lifting and supporting framework connected to and located at said opposite ends and opposite sides of said base and extending therebeneath forming a support for said base and fork openings at said opposite ends and o osite sides of said base for the lifting of the rack, said framework having bottom frame cross members and upper frame cross members at each of said opposite ends, said bottom frame cross members and said upper frame cross members are connected together but spaced apart defining said fork opening at said ends.

* * * * *

UNITED STATES PATENT AND TRADEMARK OFFICE
CERTIFICATE OF CORRECTION

| | | |
|---|---|---|
| PATENT NO. | : 8,002,128 B2 | Page 1 of 1 |
| APPLICATION NO. | : 12/354017 | |
| DATED | : August 23, 2011 | |
| INVENTOR(S) | : Karl C. Kern and Brian C. Kern | |

It is certified that error appears in the above-identified patent and that said Letters Patent is hereby corrected as shown below:

In column 8, line 56, please change "o osite" to --opposite--.

Signed and Sealed this
Thirteenth Day of December, 2011

David J. Kappos
*Director of the United States Patent and Trademark Office*